(12) United States Patent
Huang et al.

(10) Patent No.: US 10,917,561 B2
(45) Date of Patent: Feb. 9, 2021

(54) IMAGE PROCESSING IN AN UNMANNED AUTONOMOUS VEHICLE

(71) Applicant: QUALCOMM Incorporated, San Diego, CA (US)

(72) Inventors: Yin Huang, Beijing (CN); Jiangtao Ren, Beijing (CN); Xiaoyi Zhu, Beijing (CN); Liang Zhang, San Diego, CA (US); Ruowei Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/331,912

(22) PCT Filed: Sep. 23, 2016

(86) PCT No.: PCT/CN2016/099821
§ 371 (c)(1),
(2) Date: Mar. 8, 2019

(87) PCT Pub. No.: WO2018/053785
PCT Pub. Date: Mar. 29, 2018

(65) Prior Publication Data
US 2019/0208120 A1 Jul. 4, 2019

(51) Int. Cl.
*H04N 5/232* (2006.01)
*B64C 39/02* (2006.01)
(Continued)

(52) U.S. Cl.
CPC ....... *H04N 5/23229* (2013.01); *B64C 39/024* (2013.01); *B64D 47/08* (2013.01);
(Continued)

(58) Field of Classification Search
CPC .......... H04N 5/23229; H04N 5/23267; G06K 9/0063; G06K 9/3233; G06T 7/70;
(Continued)

(56) References Cited

U.S. PATENT DOCUMENTS 8,879,850 B2 11/2014 Hsu
8,902,308 B2 12/2014 Rinner et al.
(Continued)

FOREIGN PATENT DOCUMENTS

CN 105031935 A 11/2015
CN 105516583 A 4/2016
(Continued)

OTHER PUBLICATIONS

International Search Report and Written Opinion—PCT/CN2016/099821—ISA/EPO—dated Jun. 7, 2017.
(Continued)

*Primary Examiner* — Yogesh K Aggarwal
(74) *Attorney, Agent, or Firm* — The Marbury Law Group

(57) ABSTRACT

Embodiments include devices and methods for processing an image captured by an image sensor of an unmanned autonomous vehicle (UAV). A processor of the UAV may determine a body coordinate matrix of the UAV. The processor may determine an estimated rotation of the image sensor of the UAV. The processor may determine an estimated rotation of the UAV. The processor may transform an image captured by the image sensor based on the body coordinate matrix, the estimated rotation of the image sensor, and the estimated rotation of the UAV.

19 Claims, 8 Drawing Sheets

(51) Int. Cl.
*G06T 3/60* (2006.01)
*G06T 7/70* (2017.01)
*G06T 5/00* (2006.01)
*B64D 47/08* (2006.01)
*G06T 7/246* (2017.01)
*G06K 9/32* (2006.01)
*G06K 9/00* (2006.01)

(52) U.S. Cl.
CPC ............... *G06T 3/60* (2013.01); *G06T 5/006* (2013.01); *G06T 7/246* (2017.01); *G06T 7/70* (2017.01); *H04N 5/23267* (2013.01); *B64C 2201/141* (2013.01); *G06K 9/0063* (2013.01); *G06K 9/3233* (2013.01); *G06T 2207/10016* (2013.01); *G06T 2207/10032* (2013.01); *G06T 2207/30208* (2013.01); *G06T 2207/30244* (2013.01)

(58) Field of Classification Search
CPC ........... G06T 5/006; G06T 7/246; G06T 3/60; G06T 2207/30244; G06T 2207/10032; G06T 2207/30208; G06T 2207/10016; B64D 47/08; B64C 39/024; B64C 2201/141; G01S 13/582; G01S 13/003; G01S 13/42; G01S 13/825
See application file for complete search history.

(56) References Cited

U.S. PATENT DOCUMENTS

| | | | |
|---|---|---|---|
| 8,947,529 | B2 | 2/2015 | Strine et al. |
| 9,305,361 | B2 | 4/2016 | Jiang et al. |
| 9,497,380 | B1 | 11/2016 | Jannard et al. |
| 10,613,209 | B2* | 4/2020 | Emami ................. B64C 39/024 |
| 2009/0306840 | A1 | 12/2009 | Blenkhorn et al. |
| 2016/0219223 | A1* | 7/2016 | Eline .................. H04N 5/23238 |

FOREIGN PATENT DOCUMENTS

| | | |
|---|---|---|
| CN | 105812769 A | 7/2016 |
| CN | 105915786 A | 8/2016 |
| GB | 2481027 A | 12/2011 |
| KR | 101636233 B1 | 7/2016 |

OTHER PUBLICATIONS

Dharam: "Matrix Rotation and Matrix Transpose", Techie Me, Mar. 25, 2015 (Mar. 25, 2015), pp. 1-13, XP055687152, Retrieved from the Internet: URL: http://techieme.in/matrix-rotation/ [retrieved on Apr. 20, 2020] p. 2—p. 3.

Raj B., "Fundamentals of Linear Fundamentals of Linear Algebra, Part II (1-755/18-797)", Machine Learning for Signal Processing Aug. 31, 2009 (Aug. 31, 2009), p. 11, XP055687147, 68 Pages, Carnegie Mellon University, Retrieved from the Internet: URL: http://mlsp.cs.cmu.edu/courses/fall12010/class3/Class3.LinearAlgebra.Part2.pdf [retrieved on Apr. 20, 2020] p. 10-p. 11.

Supplementary European Search Report—EP16916524—Search Authority—The Hague—dated Apr. 30, 2020, 12 pages.

* cited by examiner

IMAGE PROCESSING IN AN UNMANNED AUTONOMOUS VEHICLE

RELATED APPLICATIONS

This application is a national stage application of International Patent Application No. PCT/CN2016/099821 entitled "Image Processing in an Unmanned Autonomous Vehicle" filed Sep. 23, 2016, the entire contents of which are hereby incorporated by reference for all purposes.

BACKGROUND

Unmanned autonomous vehicles (UAVs) are being developed for a wide range of applications. UAVs are typically equipped with one or more sensors, such as cameras capable of capturing an image, a sequence of images, or video. However, motion of the UAV may cause an unacceptably distorted or wobbly image or video.

Image stabilization (IS) refers to the process of detecting and correcting spurious motion introduced due to camera shake during the capture of an image or video. In the most general sense, spurious global motion may include any deviation from and intended camera path and jitter introduced due to unintended camera movement.

A variety of mechanical image stabilization mechanisms and techniques are available. However, such mechanisms are typically too heavy and too expensive for incorporation into and use with most UAVs.

SUMMARY

Various embodiments include methods that may be implemented on a processor of a UAV for processing an image captured by an image sensor of the UAV. Various embodiments may include determining a body coordinate matrix of the UAV, determining an estimated rotation of the image sensor of the UAV, determining an estimated rotation of the UAV, and transforming an image captured by the image sensor based on the body coordinate matrix, the estimated rotation of the image sensor, and the estimated rotation of the UAV. In some embodiments, the estimated rotation of the UAV may be based on one or more of the determined body coordinate matrix of the UAV, the estimated rotation of the image sensor of the UAV, and a transpose performed using the body coordinate matrix. In some embodiments, the processor of the UAV may determine a transformation matrix may transform the image captured by the image sensor of the UAV using the determined transformation matrix. In some embodiments, the processor may apply a mirror permutation matrix to the image captured by the image sensor of the UAV. In some embodiments, the processor may perform a one step operation comprising applying the transformation matrix and the mirror permutation matrix to the captured image.

Some embodiments include a UAV having an imaging sensor (e.g., a camera) and a processor configured with processor-executable instructions to perform operations of the methods summarized above. Some embodiments include a UAV having means for performing functions of the methods summarized above. Some embodiments include a processor-readable storage medium having stored thereon processor-executable instructions configured to cause a processor of a UAV to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
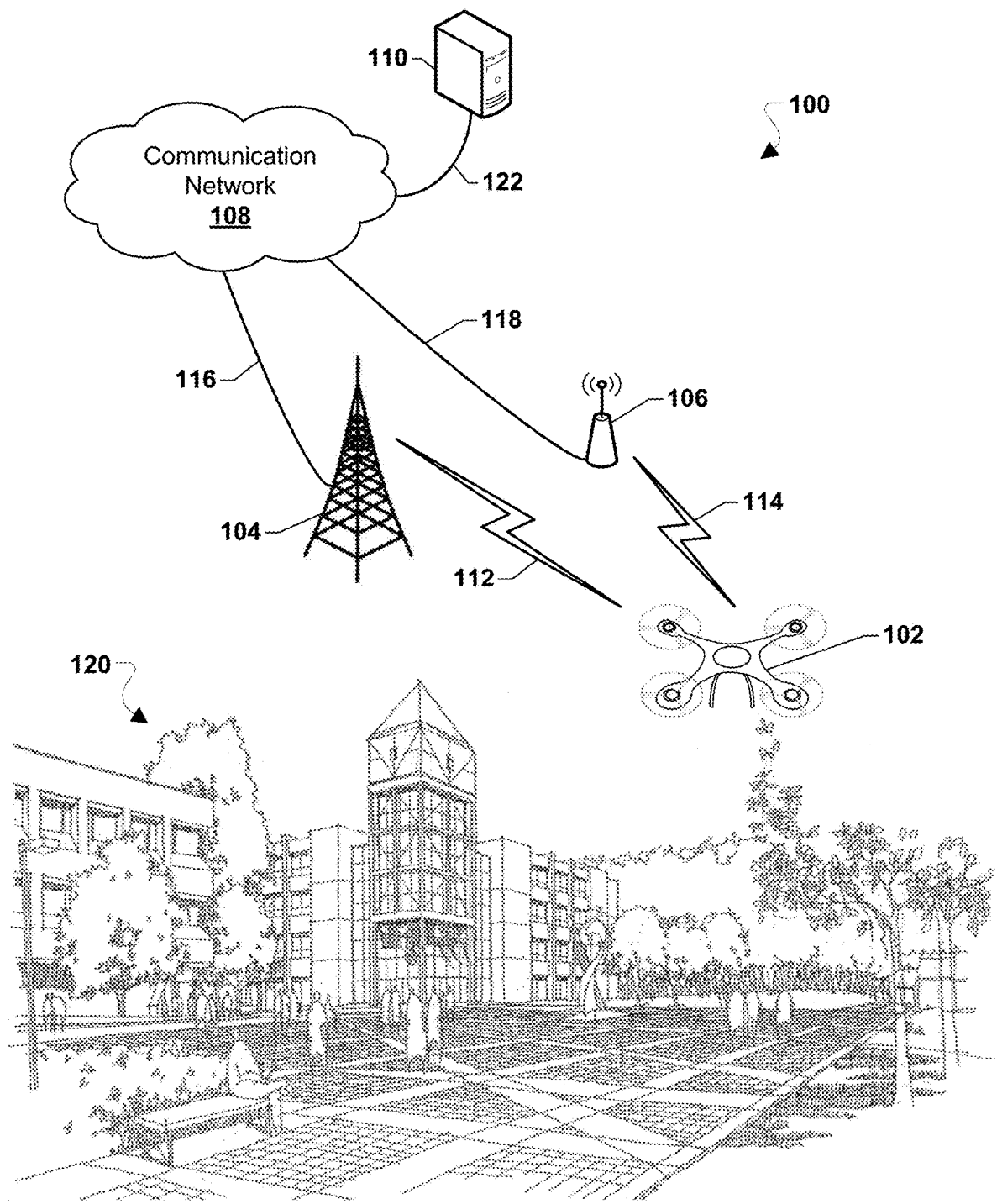
FIG. 1 is a system block diagram of a UAV operating within communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a UAV for processing an image captured by an image sensor of the UAV to realign images with the horizon and correct images for vehicle pitch and roll without the need for a physical gimbal. Various embodiments improve the efficiency and accuracy of image processing of such images for a wide range of UAV body frames that may use differing body frame coordinate systems, as well as different image sensor mountings to the UAV. Various embodiments further improve efficiency and accuracy of image processing of images captured by a UAV in motion.

As used herein, the term "UAV" refers to one of various types of unmanned autonomous vehicles. A UAV may include an onboard computing device configured to maneuver and/or navigate the UAV without remote operating instructions (i.e., autonomously), such as from a human operator or remote computing device. Alternatively, the onboard computing device may be configured to maneuver and/or navigate the UAV with some remote operating instruction or updates to instructions stored in a memory of the onboard computing device. In some implementations, a UAV may be an aerial vehicle propelled for flight using a plurality of propulsion units, each including one or more rotors, that provide propulsion and/or lifting forces for the UAV. UAV propulsion units may be powered by one or more types of electric power sources, such as batteries, fuel cells, motor-generators, solar cells, or other sources of electric power, which may also power the onboard computing device, navigation components, and/or other onboard components.

UAVs are increasingly equipped with image sensor devices for capturing images and video. UAVs equipped to image the ground suffer from the problem that pitch and roll of the vehicle leads to images that are not aligned with the horizon. Further, spurious motions of the UAV may cause jitter or other distortions in images and video. While a variety of mechanical image stabilization mechanisms are available (e.g., mechanical gimbals and optical image stabilization (OIS)), such mechanisms are typically too heavy and too expensive for incorporation into and use with most UAVs.

Digital image stabilization (DIS) and electronic image stabilization (EIS) techniques may reduce or eliminate the need for mechanical image stabilization mechanisms, such as gimbals. A processor employing a DIS technique may estimate spurious motion of the UAV based on image data, such as changes from image to image, or frame to frame. For example, the processor may determine one or more image statistics from the image data. A processor may, for example, analyze consecutive frames to calculate a transform that when applied to an image or frame reduces the effects of motion with respect to the previous image or frame. However, image statistics cannot be used to easily distinguish motion of an image sensor from motion of a subject in an image sensor's field of view. Also, use of image statistics in image stabilization may result in additional jitter or shake in a video in particular when moving subjects are present in the image sensor's field of view. Additionally DIS performance may be impaired in conditions of low light or changing illumination.

To enable EIS, a processor of a UAV may analyze sensor data from a sensor of the UAV to determine spurious motion of the UAV. For example, a processor of the UAV may detect an orientation (e.g., pitch and roll) of the UAV, motion of the UAV (e.g., in three dimensions plus motion about the pitch, roll and yaw axes), accelerations (e.g., vibrations and jitter), and/or other information that may be available from one or more sensors (e.g., gyroscopes and accelerometers) of the UAV. Using the estimated orientation and motions of the UAV, the processor of the UAV may process an image or video to correct the image of distortions caused by the orientation and motions. In some embodiments, such processing may be performed in real time or in post-processing of the image or video. For example, a processor of the UAV may use sensor data to determine a rotation and translation to be applied to the output of the image sensor between two consecutive images or frames using, e.g., a gyroscope and accelerometer.

In an EIS system, the processor the UAV may process the image or video based on a coordinate system of the UAV, and information about the mounting of an image sensor on the UAV, as well as information about an orientation of the output of the image sensor.

For example, UAVs may include a wide variety of body frames, and manufacturers of such body frames may utilize different coordinate systems, for example, in a flight controller or another processor of the UAV. One example of a body frame coordinate system is North-East-Down (NED), in which positive values along the x-axis indicates north, positive values along the y-axis indicates east, and positive values along the x-axis indicates down (i.e., toward gravity). Another example of a body frame coordinate system is North-West-Up (NWU), in which positive values along the x-axis indicates north, positive values along the y-axis indicates west, and positive values along the x-axis indicates up (i.e., away from gravity). Different UAV manufacturers and suppliers may use different coordinate systems.

As another example, an image sensor such as a camera may be mounted on the UAV using varying orientations, such as landscape orientation or portrait orientation. Further, the image sensor may output image information in a variety of orientations, such as a landscape output or a portrait output.

Various embodiments provide methods implemented by a processor of a UAV for processing an image captured by an image sensor of the UAV. Various embodiments further improve efficiency and accuracy of image processing of images captured by a UAV in motion, and further improve the efficiency and accuracy of image processing of such images for a wide range of UAV body frames that may use differing body frame coordinate systems, as well as different image sensor mountings to the UAV.

In various embodiments, the processor of the UAV may determine a body coordinate matrix of the UAV, an estimated rotation of the image sensor of the UAV, and an estimated rotation (i.e., pitch and roll with respect to a reference frame) of the UAV. The processor of the UAV may transform an image captured by the image sensor based on the body coordinate matrix, the estimated rotation of the image sensor, and the estimated rotation of the UAV. In some embodiments, the estimated rotation of the UAV may be based on one or more of the determined body coordinate matrix of the UAV, the estimated rotation of the image sensor of the UAV, and a transpose performed using the body coordinate matrix. In some embodiments, the processor of the UAV may determine a transformation matrix, and transform the image captured by the image sensor of the UAV using the determined transformation matrix. In some embodiments, the processor may apply a mirror permutation matrix to the image captured by the image sensor of the UAV. In some embodiments, the processor may perform a one step operation comprising applying the transformation matrix and the mirror permutation matrix to the captured image.

Various embodiments may be implemented within a UAV operating within a variety of communication systems 100, an example of which is illustrated in FIG. 1. With reference to FIG. 1, the communication system 100 may include a UAV 102, a base station 104, an access point 106, a communication network 108, and a network element 110.

The base station 104 and the access point 106 may provide wireless communications to access the communication network 108 over a wired and/or wireless communications backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The UAV 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The UAV 102 and the network element 110 may communicate via the communication network 108. The network element 110 may provide the UAV 102 with a variety of information, such as navigation information, weather information, information about local air, ground, and/or sea traffic, movement control instructions, and other information, instructions, or commands relevant to operations of the UAV 102.

In various embodiments, the UAV 102 may move through an environment 120. As the UAV 102 moves through the environment 120, the processor of the UAV 102 may capture images or video of an aspect of the environment 120.

Figure 2:
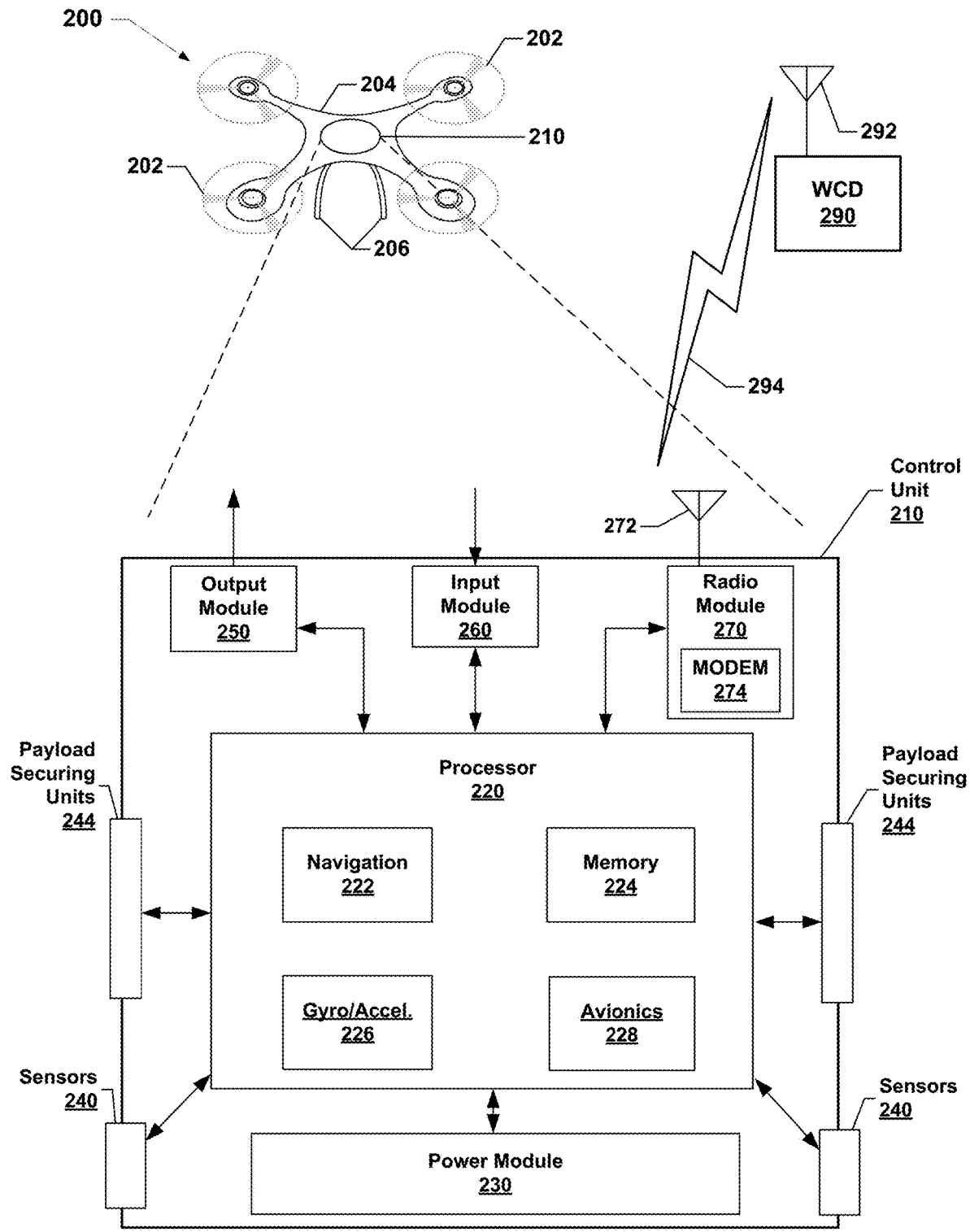
FIG. 2 is a component block diagram illustrating components of a UAV according to various embodiments.

UAVs may include winged or rotorcraft varieties. FIG. 2 illustrates an example UAV 200 of a rotary propulsion design that utilizes one or more rotors 202 driven by corresponding motors to provide lift-off (or take-off) as well as other aerial movements (e.g., forward progression, ascension, descending, lateral movements, tilting, rotating, etc.). The UAV 200 is illustrated as an example of a UAV that may utilize various embodiments, but is not intended to imply or require that various embodiments are limited to rotorcraft UAVs. Various embodiments may be used with winged UAVs as well. Further, various embodiments may equally be used with land-based autonomous vehicles, water-borne autonomous vehicles, and space-based autonomous vehicles.

With reference to FIGS. 1 and 2, the UAV 200 may be similar to the UAV 102. The UAV 200 may include a number of rotors 202, a frame 204, and landing columns 206 or skids. The frame 204 may provide structural support for the motors associated with the rotors 202. The landing columns 206 may support the maximum load weight for the combination of the components of the UAV 200 and, in some cases, a payload. For ease of description and illustration, some detailed aspects of the UAV 200 are omitted such as wiring, frame structure interconnects, or other features that would be known to one of skill in the art. For example, while the UAV 200 is shown and described as having a frame 204 having a number of support members or frame structures, the UAV 200 may be constructed using a molded frame in which support is obtained through the molded structure. While the illustrated UAV 200 has four rotors 202, this is merely exemplary and various embodiments may include more or fewer than four rotors 202.

The UAV 200 may further include a control unit 210 that may house various circuits and devices used to power and control the operation of the UAV 200. The control unit 210 may include a processor 220, a power module 230, sensors 240, payload-securing units 244, an output module 250, an input module 260, and a radio module 270.

The processor 220 may be configured with processor-executable instructions to control travel and other operations of the UAV 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the UAV 200 that may be used in navigation and positioning calculations, as well as providing data used in various embodiments for processing images.

The processor 220 may further receive additional information from the sensors 240, such as an image sensor or optical sensor (e.g., capable of sensing visible light, infrared, ultraviolet, and/or other wavelengths of light). The sensors 240 may also include a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the UAV 200 has made contact with a surface. The payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing units 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The UAV 200 may be controlled through control of the individual motors of the rotors 202 as the UAV 200 progresses toward a destination. The processor 220 may receive data from the navigation unit 222 and use such data in order to determine the present position and orientation of the UAV 200, as well as the appropriate course towards the destination or intermediate sites. In various embodiments, the navigation unit 222 may include a GNSS receiver system (e.g., one or more global positioning system (GPS) receivers) enabling the UAV 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omnidirectional range (VOR) beacons), Wi-Fi access points, cellular network sites, radio station, remote computing devices, other UAVs, etc.

The radio module 270 may be configured to receive navigation signals, such as signals from aviation navigation facilities, etc., and provide such signals to the processor 220 and/or the navigation unit 222 to assist in UAV navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smailphone, a tablet, or another computing device with which the UAV 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a UAV operator, a third party service (e.g., package delivery, billing, etc.), or a site communication access point. The UAV 200 may communicate with a server through one or more intermediate communication links, such as a wireless telephony network that is coupled to a wide area network (e.g., the Internet) or other communication devices. In some embodiments, the UAV 200 may include and employ other forms of radio communication, such as mesh connections with other UAVs or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

While various components of the control unit 210 are illustrated as separate components, some or all of the components (e.g., the processor 220, the output module 250, the radio module 270, and other units) may be integrated together in a single device or module, such as a system-on-chip module.

Figure 3A:
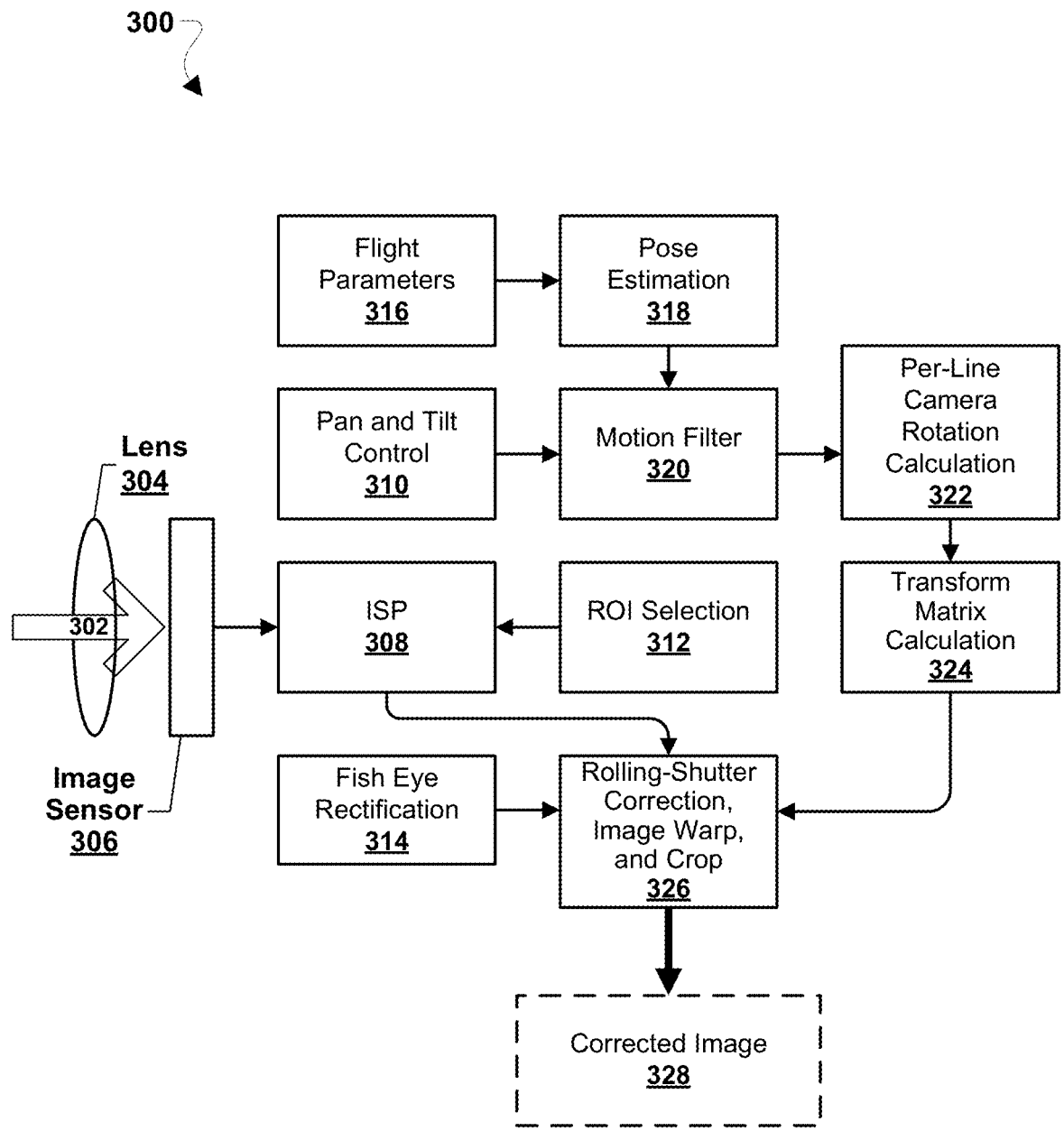
FIG. 3A is a component block diagram illustrating components of an image capture and processing system of a UAV according to various embodiments.

FIG. 3A illustrates an image capture and processing system 300 of a UAV (e.g., 102, 200 in FIGS. 1 and 2) according to various embodiments. With reference to FIGS. 1-3A, the image capture and processing system 300 may be implemented in hardware components and/or software components of the UAV, the operation of which may be controlled by one or more processors (e.g., the processor 220 and/or the like) of the UAV. To enable digital image stabilization, spurious motion of the UAV may be estimated from information detected by a processor of the UAV. One embodiment of components that may enable such digital image stabilization is illustrated in the image capture and processing system 300.

An image sensor 306 may capture light of an image 302 that enters through a lens 304. The lens 304 may include a fish eye lens or another similar lens that may be configured to provide a wide image capture angle. The image sensor 306 may provide image data to an image signal processing (ISP) unit 308. A region of interest (ROI) selection unit 312 may provide data to the ISP 308 data for the selection of a region of interest within the image data.

The ISP 308 may provide image information and ROI selection information to a rolling-shutter correction, image warp, and crop unit 326. A fish eye rectification unit 314 may provide information and/or processing functions to the rolling-shutter correction, image warp, and crop unit 326.

A flight parameters unit 316 may determine inertial measurement data and UAV position and orientation data. For example, the flight parameters unit 316 may obtain or receive the inertial measurement data and UAV position and orientation data from one or more sensors of the UAV (e.g., the sensors 240) The flight parameters unit 316 may provide the inertial measurement data and UAV position and orientation data to a pose estimation unit 318. ("Pose" is a poi imanteau of "position" and "orientation.")

The pose estimation unit 318 may determine a position and orientation of the UAV based on the inertial measure data and the position and orientation data. In some embodiments, the pose estimation unit 318 may determine the position and orientation (e.g., pitch, roll, and yaw) of the UAV based on a coordinate system of the UAV (e.g., NED or NWU). The pose estimate unit 318 may provide the determined position and orientation of the UAV to a motion filter unit 320. Additionally, a pan and tilt control unit 310 may provide data about the pan and/or tilt of the image sensor to the motion filter unit 320.

The motion filter unit 320 may determine physical and/or virtual pose changes of an image sensor of the UAV (e.g., a sensor 240) based on the position and orientation information from the pose estimation unit 318 and the pan and/or tilt information from the pan and tilt control unit 310. In some embodiments, the motion filter unit 320 may determine the physical or virtual pose changes of the image sensor over time. In some embodiments, the motion filter unit 320 may determine the physical or virtual pose changes based on one or more changes between a first image and second subsequent image. In some embodiments, the motion filter unit 320 may determine the physical or virtual pose changes of the image sensor on a frame-by-frame basis. The motion filter unit may provide the determined physical and/or virtual pose changes of an image sensor to a per-line camera rotation calculation unit 322.

The per-line camera rotation calculation unit 322 may determine a rotation to perform to the image information on a line-by-line basis. The per-line camera rotation calculation unit 322 may provide information about the determined rotation to a transform matrix calculation unit 324.

The transform matrix calculation unit 324 may determine a transformation matrix for use in processing an image. The transform matrix calculation unit 324 may provide the transformation matrix to the rolling-shutter correction and warp unit 326.

The rolling-shutter correction and warp unit 326 may crop the image information, correct for distortions in the image caused by the lens 304, and may apply the transformation matrix to the image information. The rolling-shutter correction and warp unit 326 may provide as output a corrected image 328 based on the cropping, distortion correction, and/or application of the transformation matrix. In some embodiments, the corrected image may include an image having a corrected horizontal orientation or horizontal rotation. In some embodiments, the corrected image may include a stabilized video output.

Figure 3B:
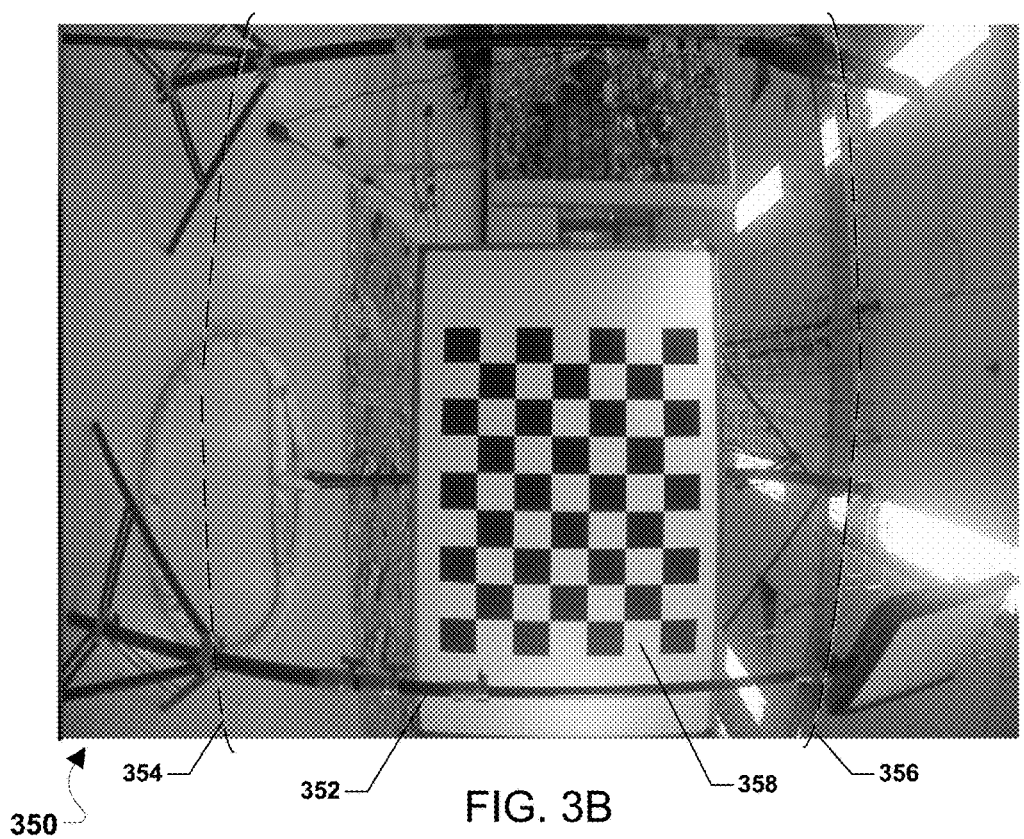
FIG. 3B illustrates a distorted image according to various embodiments.

FIG. 3B illustrates a distorted image 350 according to various embodiments. With reference to FIGS. 1-3B, the distorted image 350 may include one or more distortions, for example a curvature of a straight object 352, or the distortions indicated by distortion markers 354 and 356, and by the test image 358.

Figure 3C:
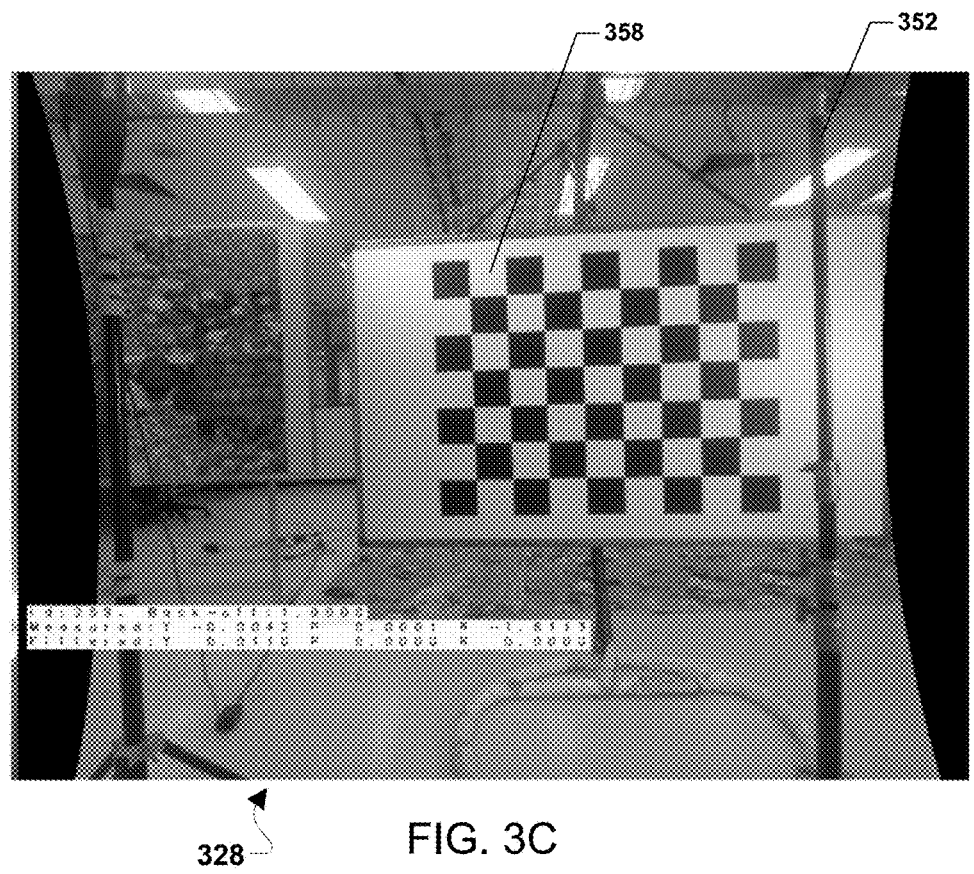
FIG. 3C illustrates a corrected image according to various embodiments.

FIG. 3C illustrates a corrected image 328 according to various embodiments. With reference to FIGS. 1-3C, corrected image 328 has been rotated 90 degrees counterclockwise, and includes corrections to, for example, the straight object 352 and the test image 358.

Figure 4A:
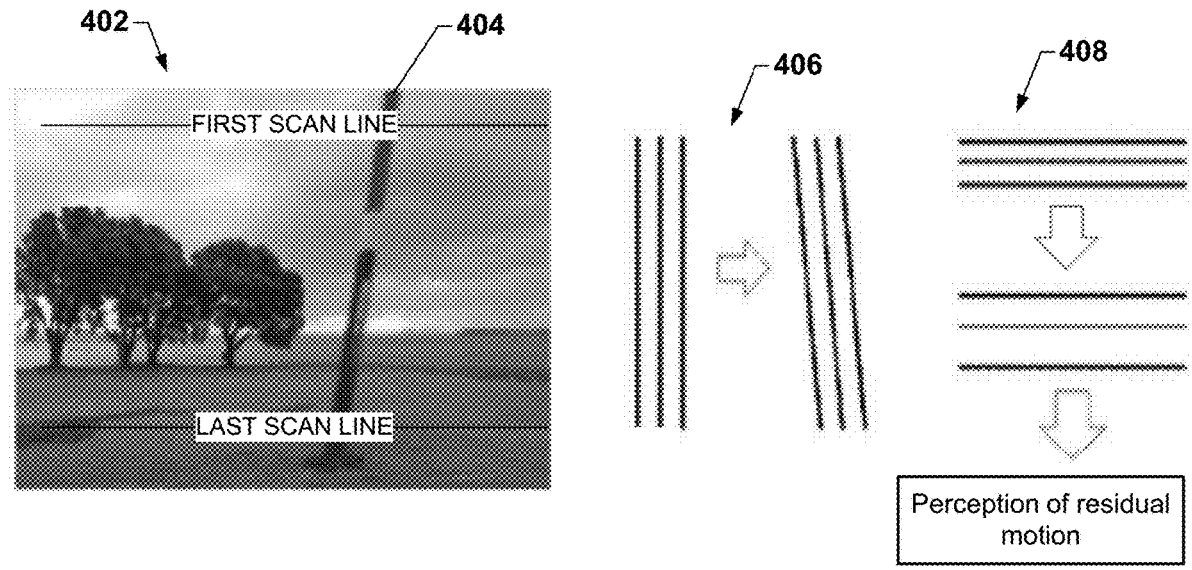
FIGS. 4A and 4B illustrate image distortion in an image captured by an image sensor on a moving platform according to various embodiments.
Figure 4B:
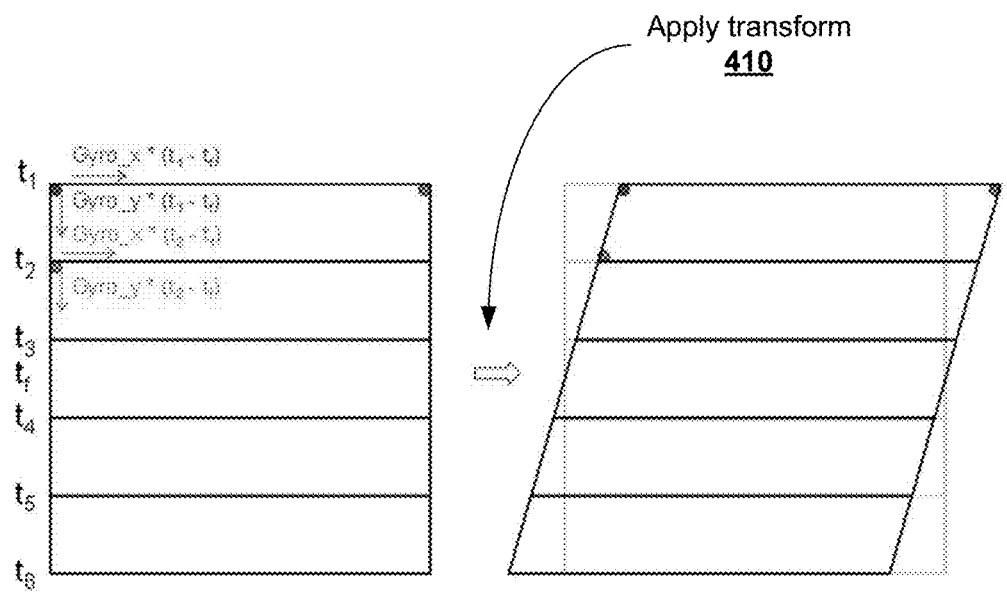

FIGS. 4A and 4B illustrate image distortion in an image captured by an image sensor on a moving platform according to various embodiments. With reference to FIGS. 1-4B, a processor of a UAV (e.g., the processor 220 and/or the like) and hardware components and/or software components of the UAV may capture and process an image or video using an image sensor of the UAV (e.g., the sensor 240).

FIG. 4A illustrates an image 402 captured by a moving image sensor, which includes a skewed object 404. For example, rolling shutter distortion may occur in images, and particularly video, captured by certain image sensors (e.g., complementary metal-oxide-semiconductor (CMOS) image sensors), which record every frame line-by-line from top to bottom of the image, rather than as a single snapshot at a point in time. Because parts of the image are captured at different times, image sensor motion may cause image distortion referred to as a "jelly-effect" or "Jello wobble." The distortion illustrated in the image 402 may be caused by an object moving quickly through the image sensor's field of view, or by camera translation (e.g., horizontal or rotational motion of the camera). In addition, fast-moving objects may be distorted with diagonal skews, as illustrated by a skewed object 404 in the image 402. A processor may determine motion of the images sensor during the time taken to traverse from the first to the last line of the frame, and the processor may correct for sensor-motion induced rolling shutter distortion.

FIG. 4B illustrates rolling shutter distortion that may be cause by a pitch and a yaw of a motion sensor. Image sensor rotation (e.g., caused by pitch and yaw of a platform of the image sensor, e.g., a UAV) may cause two distinct effects due to the rolling shutter. For example, changes in yaw during exposure of a frame may cause vertical lines to develop a diagonal skew 406. In addition, changes in pitch during exposure of a frame may change a separation 408 between horizontal lines and may lead to a perception of residual motion along a Y-axis (e.g., horizontal axis) of the image.

In some embodiments, a processor may correct rolling shutter distortion by modeling a motion of pixels within the image or frame. For example, the processor may divide the image or frame into multiple sub-frames and calculate an affine transform for each sub-frame. In some implementations, the processor may model the motion of pixels captured at times t1-t6 as compared to time tf. Time tf may include a selected reference time, which may be a midpoint time between times t1 and t6. In some embodiments, time t1 may equal the start time of frame capture (SOF) minus half of an exposure duration (a duration of time during which the image or frame is captured), and may be represented according to the following equation:

$$t1 = SOF - exposure/2 \qquad \text{[Equation 1]}$$

In some embodiments, t6 may equal the end time of frame capture (EOF) minus half of the exposure duration, and may be represented according to the following equation:

$$t6 = EOF - exposure/2 \qquad \text{[Equation 2]}$$

In some embodiments, tf may be represented according to the following equation:

$$tf = (t1 + t6)/2 \qquad \text{[Equation 3]}$$

In some embodiments, the processor may determine the number of sub-frames (e.g., sub-frames at times t1, t2, t3, t4, t5, and t6) as a function of a maximum frequency of motion (which may be set as an image capture parameter).

The processor may then determine a transform, such as an affine transform, for time tf. The processor may apply the determined transform 410 to each sub-frame. Applying the transform to each sub-frame functions to model the entire frame as being captured by a global shutter at time tf.

Figure 5A:
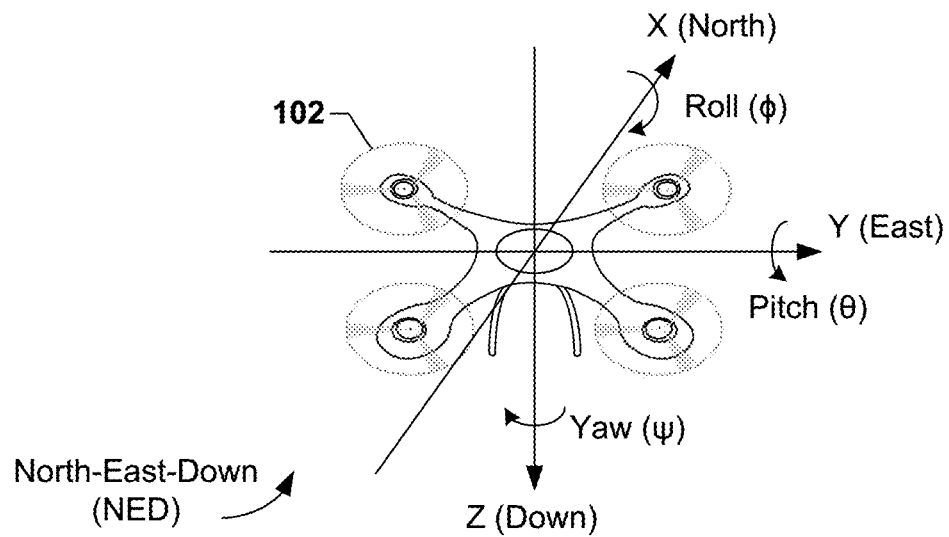
FIGS. 5A and 5B illustrate coordinate systems of UAVs according to various embodiments.
Figure 5B:
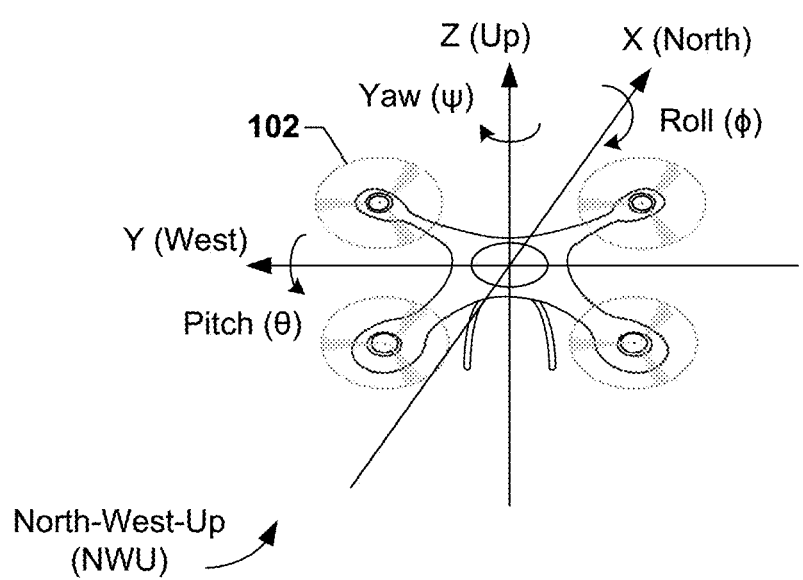

FIGS. 5A and 5B illustrate body frame coordinate systems of UAVs according to various embodiments. With reference to FIGS. 1-5B, a processor of a UAV (e.g., the processor 220 and/or the like) and hardware components and/or software components of the UAV may capture and process an image or video based on a coordinate system of the UAV (in addition to information about the mounting or orientation of an image sensor on the UAV, and information about an orientation of the output of the image sensor). UAVs may include a wide variety of body frames, and manufacturers of such body frames may utilize different coordinate systems, for example, in a flight controller or another processor of the UAV.

FIG. 5A illustrates an example of a North-East-Down (NED) body frame coordinate system, in which positive values along the x-axis indicates north, positive values along the y-axis indicates east, and positive values along the x-axis indicates down (i.e., toward gravity).

FIG. 5B illustrates an example of a North-West-Up (NWU) body frame coordinate system in which positive values along the x-axis indicates north, positive values along the y-axis indicates west, and positive values along the x-axis indicates up (i.e., away from gravity).

Figure 6:
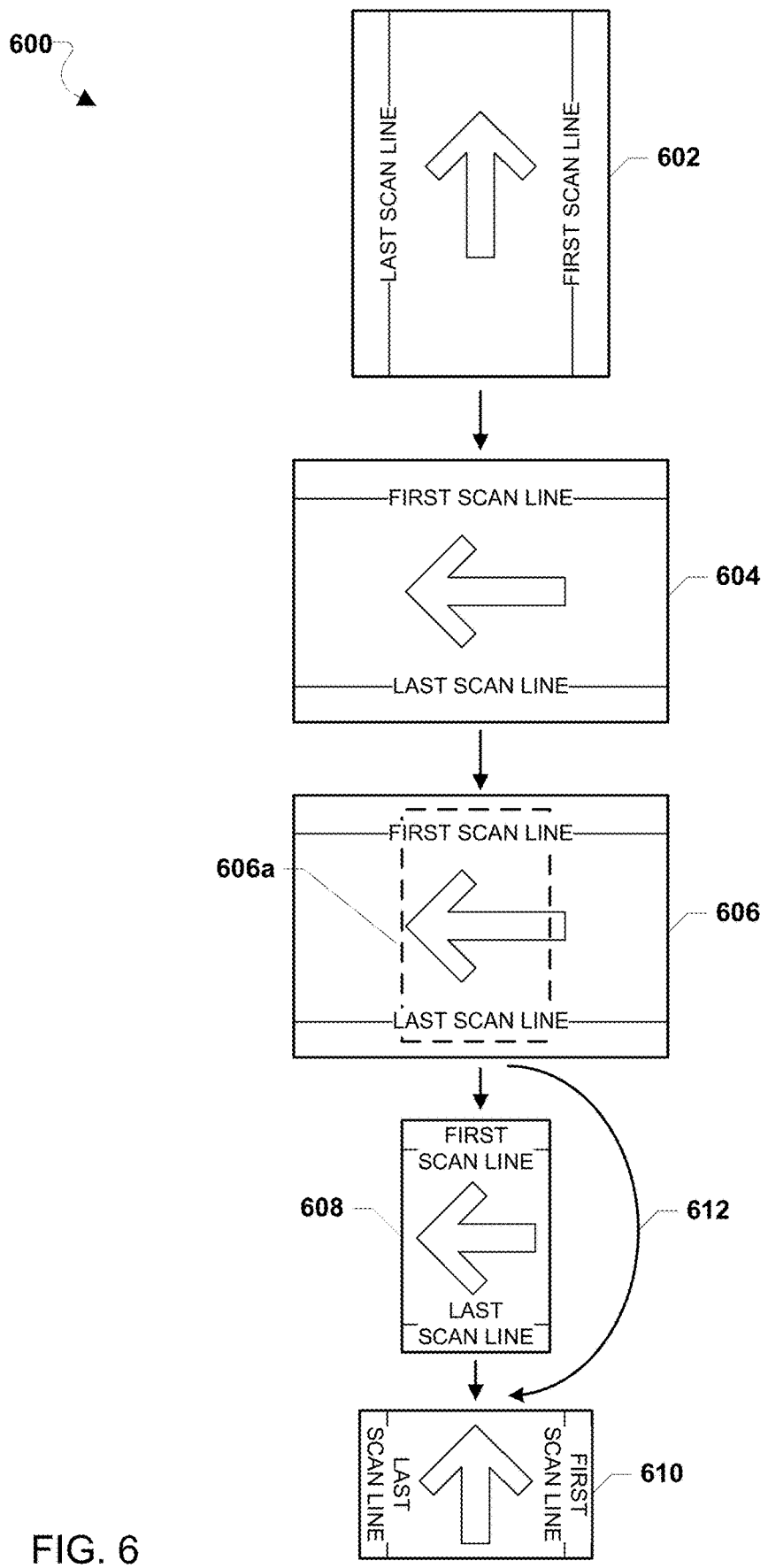
FIG. 6 is a sequence of image mockups illustrating a method of image processing in a UAV according to various embodiments.

FIG. 6 illustrates images involved in an image processing method 600 according to various embodiments. With reference to FIGS. 1-6, a processor of a UAV (e.g., the processor 220 and/or the like) and hardware components and/or software components of the UAV may capture and process an image or video using an image sensor of the UAV (e.g., the sensor 240).

Image 602 represents image information captured by an image sensor of the UAV. In the illustrated example, the image 602 is captured in portrait orientation. In some embodiments, some types of image sensors (e.g., CMOS image sensors) may capture the image 602 in one or more sequential scan lines. For example, the image sensor may capture the image 602 from a first scan line on the right side of the image 602 to a last scan line on the left side of the image 602.

Image 604 represents image information that is read out from the image sensor by the processor of the UAV. The image read out from the image sensor may be rotated compared to the image information captured by the image sensor. For example, the image 604 is rotated 90 degrees counterclockwise into a landscape orientation compared to the image 602.

Image 606 includes an identified region of interest 606a. In some embodiments, the processor of the UAV may identify a region of interest within the image information that is read out from the image sensor. In some embodiments, the processor may identify the region of interest based on a predetermined crop region or target region of the image information. In some embodiments, the processor may apply a crop margin around of the identified region of interest 606a. In some implementations, the processor may apply a crop margin in a range of 10-20%. For example, the processor may apply a crop margin of 10% in which case the processor may crop 5% of the image from the top and the bottom, and from each of the left and the right side.

Image 608 represents the cropped image based on the identified region of interest 606a. In some embodiments, the image 608 may be in a portrait orientation.

Image 610 represents a final output image. In some embodiments, the processor of the UAV may apply a mirror and permutation operation to the image 608 to transform the portrait orientation of the image 608 to a landscape orientation.

In some embodiments, the processor of the UAV may perform one or more operations in a single step transform 612 the identified region of interest 606a to the final output image 610. In some implementations, the single step 612 may include a one step reverse warp operation.

For example, the processor of the UAV may compute or obtain a mirror and permutation matrix. One example of a mirror and permutation matrix may be represented as "P" in the equation below:

$$P = \begin{bmatrix} 0 & 1 & 0 \\ 1 & 0 & 0 \\ 0 & 0 & 1 \end{bmatrix} \qquad \text{[Equation 4]}$$

The processor of the UAV may further compute a transformation matrix, which may be represented as "TF". In some embodiments, the processor may calculate or obtain an estimated rotation Rc of the UAV, which may be represented by the following equation:

$$R_c = R_{bc}{}^T R_{sb} R_{bc} \qquad \text{[Equation 5]}$$

In equation 5, Rbc represents a body coordinate matrix of the UAV, which may be based on the body frame coordinate system of the UAV (e.g., NED or NWU); T represents a transpose performed using the body coordinate matrix; and Rsb represents an estimated rotation of the image sensor on the UAV. In some embodiments, the processor may determine the estimated rotation of the image sensor relative to the body frame coordinate system of the UAV. In some embodiments, the estimated rotation of the image sensor may include a determination of an orientation of the image sensor (e.g., landscape or portrait). In some embodiments, the estimated rotation of the image sensor may be determined as a numerical rotation, e.g., in degrees.

The processor of the UAV computes the transformation matrix based in part on the estimated rotation of the UAV, which may be represented by the following equation:

$$TF = KR_cK^{-1} \qquad \text{[Equation 6]}$$

In equation 6, K represents a camera matrix that is based on a representation of the image to be transformed (e.g., the image of the region of interest 606a), and $K^{-1}$ represents an inverse camera matrix.

In some embodiments, the processor of the UAV may perform a composite or one step operation (e.g., a one step reverse warp operation) in the single step 612. The one step operation may be represented by the following equation:

$$TFcomp = TF*P \qquad \text{[Equation 7]}$$

Performing an image warp process may require a processor to perform a pixel-by-pixel read/write operation, which may be processor-intensive and may require both high processing throughput and high bandwidth throughput. Performing the composite or one step operation reduces processing demands on the processor and other processing resources, as well as reducing consumption of a battery or other power resources.

Figure 7:
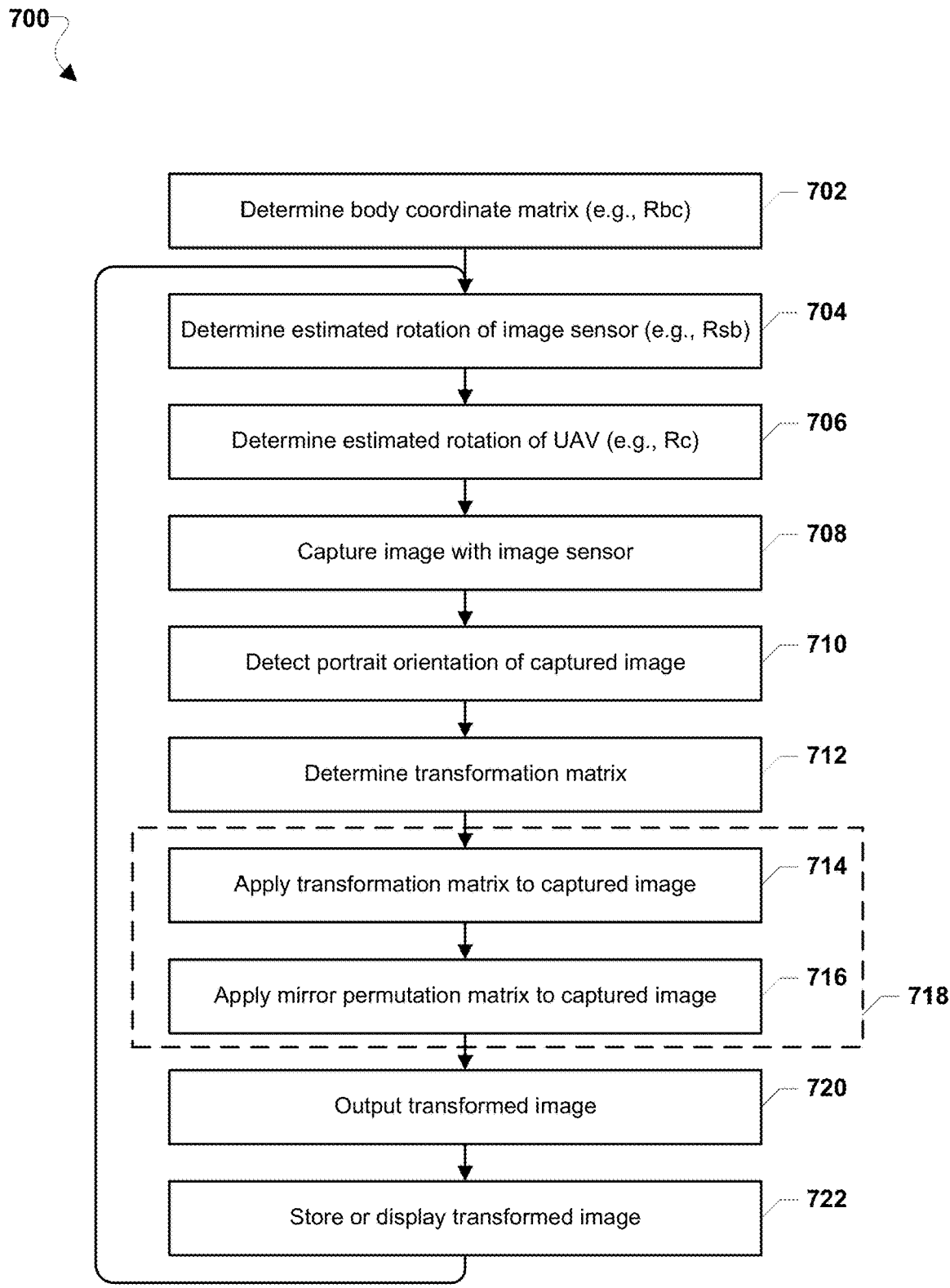
FIG. 7 is a process flow diagram illustrating a method of image processing in a UAV according to various embodiments.

FIG. 7 illustrates a method 700 of image processing in a UAV (e.g., 102, 200 in FIGS. 1 and 2) according to various embodiments. With reference to FIGS. 1-7, the method 700 may be implemented by a processor (e.g., the processor 220 and/or the like) of the UAV.

In block 702, the processor may determine a body coordinate matrix (e.g., Rbc). In some embodiments, the body coordinate matrix may be based on a body frame coordinate system of the UAV, such as NED and NWU.

In block 704, the processor may determine an estimated rotation of an image sensor of the UAV (e.g., Rsb). In some embodiments, the processor may determine the estimated rotation of the image sensor relative to the body frame coordinate system of the UAV.

In block 706, the processor may determine an estimated rotation of the UAV (e.g., Rc). In some embodiments, the processor may determine the estimated rotation of the UAV based on data from one or more sensors of the UAV and/or data supplied by a flight control system of the UAV. In some embodiments, the processor may determine the estimated rotation of the UAV based on the determined body coordinate matrix and/or the determined estimated rotation of the image sensor.

In block 708, the processor may capture an image with the image sensor of the UAV.

In block 710, the processor may detect that the image captured by the image sensor is in a portrait orientation. For example, the processor may determine that image information that is captured by the image sensor (e.g., the image 602)

In block 712, the processor may determine a transformation matrix. In some embodiments, the processor may determine the transformation matrix based on the estimated rotation of the UAV. In some embodiments, the processor may determine the transformation matrix based on a camera matrix. In some embodiments, the processor may determine the transformation matrix based on an inverse camera matrix.

In block 714, the processor may apply the transformation matrix to the captured image.

In block 716, the processor may apply a mirror permutation matrix to the captured image. In some embodiments, the processor may compute or obtain the mirror permutation matrix, and apply the computed mirror permutation matrix to the captured image.

In some embodiments, the processor may perform a composite or one step operation in which the processor applies transformation matrix and the mere permutation matrix to the captured image in optional operation 718. In some embodiments, the optional operation 718 may include the operations of blocks 714 and 716.

In block 720, the processor may output the transformed image.

In block 722, the processor may store the transformed image (e.g., in a memory of the UAV) or may display the transformed image (e.g., on a display of the UAV, or on a display of a device that may be in communication with the UAV, e.g., the wireless communication device 290).

The operations of the method 700 may be performed for each captured image as the processor may again determine the estimated rotation of the image sensor in block 704.

Various embodiments enable the processor of the UAV to improve image capture and processing by the UAV. Various embodiments also improve the efficiency of image capture and processing by the UAV. Various embodiments further improve the accuracy of image stabilization and correction of distortions cause during image capture by the image sensor. Various embodiments enable improved image capture and processing by the UAV for a variety of body frame coordinate systems. Various embodiments further enable improved image capture and processing by the UAV for a variety of mounting orientations of the image sensor to the body frame of the UAV. Moreover, various embodiments further enable improved image capture and processing by the UAV for a variety of image output orientations of an image output by the image sensor.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600 and 700 may be substituted for or combined with one or more operations of the methods 600 and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of processing an image captured by an image sensor of an unmanned autonomous vehicle (UAV), comprising:
   determining a body coordinate matrix of the UAV;
   determining an estimated rotation of the image sensor of the UAV;
   determining an estimated rotation of the UAV based on a transpose performed using the body coordinate matrix; and transforming an image captured by the image sensor based on the body coordinate matrix, the estimated rotation of the image sensor, and the estimated rotation of the UAV.

2. The method of claim 1, further comprising:
determining a transformation matrix,
wherein transforming the image captured by the image sensor based on the body coordinate matrix, the estimated rotation of the image sensor, and the estimated rotation of the UAV further comprises transforming the image captured by the image sensor of the UAV using the determined transformation matrix.

3. The method of claim 2, wherein the transformation matrix is based on the estimated rotation of the UAV.

4. The method of claim 1, wherein transforming the image captured by the image sensor based on the body coordinate matrix, the estimated rotation of the image sensor, and the estimated rotation of the UAV comprises:
applying a mirror permutation matrix to the image captured by the image sensor of the UAV.

5. The method of claim 1, wherein transforming the image captured by the image sensor based on the body coordinate matrix, the estimated rotation of the image sensor, and the estimated rotation of the UAV comprises:
performing a one step operation comprising applying a transformation matrix and applying a mirror permutation matrix to the image captured by the image sensor of the UAV.

6. The method of claim 1, further comprising:
outputting the transformed image; and
performing one of storing or displaying the transformed image.

7. An image processing system, comprising:
an image sensor;
a memory coupled to the image sensor; and
a processor coupled to the image sensor and memory and configured with processor-executable instructions to:
determine a body coordinate matrix of the image processing system;
determine an estimated rotation of the image sensor of the image processing system;
determine an estimated rotation of the image processing system based on a transpose performed using the body coordinate matrix; and
transform an image captured by the image sensor based on the body coordinate matrix, the estimated rotation of the image sensor, and the estimated rotation of the image processing system.

8. The image processing system of claim 7, wherein the processor is further configured with the processor-executable instructions to:
determine a transformation matrix; and
transform the image captured by the image sensor of the image processing system using the determined transformation matrix.

9. The image processing system of claim 8, wherein the processor is further configured with the processor-executable instructions such that the transformation matrix is based on the estimated rotation of the image processing system.

10. The image processing system of claim 7, wherein the processor is further configured with the processor-executable instructions to:
apply a mirror permutation matrix to the image captured by the image sensor of the image processing system.

11. The image processing system of claim 7, wherein the processor is further configured with the processor-executable instructions to:
perform a one step operation comprising applying a transformation matrix and applying a mirror permutation matrix to the image captured by the image sensor of the image processing system.

12. The image processing system of claim 7, wherein the processor is further configured with the processor-executable instructions to:
output the transformed image; and
perform one of storing or displaying the transformed image.

13. The image processor of claim 7, wherein the image processor is mounted on an unmanned autonomous vehicle (UAV).

14. A non-transitory processor-readable storage medium having stored thereon processor-executable instructions configured to cause a processor of an unmanned autonomous vehicle (UAV) to perform operations comprising:
determining a body coordinate matrix of the UAV;
determining an estimated rotation of an image sensor of the UAV;
determining an estimated rotation of the UAV based on a transpose performed using the body coordinate matrix; and
transforming an image captured by the image sensor based on the body coordinate matrix, the estimated rotation of the image sensor, and the estimated rotation of the UAV.

15. The non-transitory processor-readable storage medium of claim 14, wherein the stored processor-executable instructions are configured to cause the processor of the UAV to perform operations further comprising:
determining a transformation matrix,
wherein transforming the image captured by the image sensor based on the body coordinate matrix, the estimated rotation of the image sensor, and the estimated rotation of the UAV further comprises transforming the image captured by the image sensor of the UAV using the determined transformation matrix.

16. The non-transitory processor-readable storage medium of claim 15, wherein the transformation matrix is based on the estimated rotation of the UAV.

17. The non-transitory processor-readable storage medium of claim 14, wherein the stored processor-executable instructions are configured to cause the processor of the UAV to transform the image captured by the image sensor based on the body coordinate matrix, the estimated rotation of the image sensor, and the estimated rotation of the UAV by:
applying a mirror permutation matrix to the image captured by the image sensor of the UAV.

18. The non-transitory processor-readable storage medium of claim 14, wherein the stored processor-executable instructions are configured to cause the processor of the UAV to transform the image captured by the image sensor based on the body coordinate matrix, the estimated rotation of the image sensor, and the estimated rotation of the UAV by:
performing a one step operation comprising applying a transformation matrix and applying a mirror permutation matrix to the image captured by the image sensor of the UAV.

19. The non-transitory processor-readable storage medium of claim 14, wherein the stored processor-executable instructions are configured to cause the processor of the UAV to perform operations further comprising:

outputting the transformed image; and
performing one of storing or displaying the transformed image.

\* \* \* \* \*